(12) United States Patent
Obeidi et al.

(10) Patent No.: US 11,947,536 B2
(45) Date of Patent: Apr. 2, 2024

(54) IDENTIFYING AND PROCESSING POLY-PROCESS NATURAL LANGUAGE QUERIES

(71) Applicant: INTERNATIONAL BUSINESS MACHINES CORPORATION, Armonk, NY (US)

(72) Inventors: Yazan Obeidi, Markham (CA); Jaydeep Sen, Bangalore (IN); Tarun Tater, Mundwa (IN); Vatche Isahagian, Belmont, MA (US); Vinod Muthusamy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 17/804,116

(22) Filed: May 26, 2022

(65) Prior Publication Data
US 2023/0385275 A1  Nov. 30, 2023

(51) Int. Cl.
*G06F 16/24* (2019.01)
*G06F 16/242* (2019.01)
(Continued)

(52) U.S. Cl.
CPC ...... *G06F 16/24535* (2019.01); *G06F 16/243* (2019.01); *G06F 16/24542* (2019.01)

(58) Field of Classification Search
None
See application file for complete search history.

(56) References Cited

U.S. PATENT DOCUMENTS 6,341,277 B1 * 1/2002 Coden ............... G06F 16/24535
707/999.005
8,214,350 B1 * 7/2012 Chamberlain ...... G06F 16/2458
(Continued)

FOREIGN PATENT DOCUMENTS

KR 20190059731 A 5/2019
WO 2018077655 A1 5/2018

OTHER PUBLICATIONS

Agrawal, et al., "An Approach For Multidomain Query Optimization and Answering", International Journal of Engineering Research & Technology (IJERT), vol. 2 Issue 7, Jul. 2013, pp. 1317-1324. https://www.ijert.org/an-approach-for-multidomain-query-optimization-and-answering.
(Continued)

*Primary Examiner* — Son T Hoang
(74) *Attorney, Agent, or Firm* — Daniel G. DeLuca

(57) ABSTRACT

An embodiment for identifying and processing poly-process natural language queries may include receiving a natural language query. The embodiment may also automatically identify a bridge entity in the received natural language query. The embodiment may also automatically determine whether the received natural language query is a poly-process query. The embodiment may further include, in response to identifying that the received natural language query is the poly-process query, automatically generating sub-queries for each process in the poly-process query and generate results for each sub-query. The embodiment may also automatically combining the results of each sub-query using the bridge entity to output a combined result. The embodiment may further include automatically generating a modified sub-query for post-processing of the combined result. The embodiment may also automatically process the
(Continued)

modified sub-query to generate a final query result for the received natural language query.

17 Claims, 5 Drawing Sheets

(51) Int. Cl.
  *G06F 16/245* (2019.01)
  *G06F 16/2453* (2019.01)

(56) References Cited

U.S. PATENT DOCUMENTS

| | | | | |
|---|---|---|---|---|
| 11,132,504 | B1* | 9/2021 | Mont-Reynaud | G06F 16/24 |
| 2003/0212699 | A1* | 11/2003 | Denesuk | G06F 16/951 |
| | | | | 707/999.102 |
| 2011/0040749 | A1* | 2/2011 | Ceri | G06F 16/9535 |
| | | | | 707/723 |
| 2014/0289236 | A1* | 9/2014 | Agarwal | G06F 16/3334 |
| | | | | 707/725 |
| 2019/0073598 | A1* | 3/2019 | Giovannini | G06F 16/2471 |
| 2021/0073474 | A1* | 3/2021 | Sengupta | G06F 16/24 |
| 2021/0216601 | A1* | 7/2021 | Galitsky | G06F 16/24564 |
| 2021/0406271 | A1* | 12/2021 | Meling | G06F 16/3344 |
| 2022/0067004 | A1* | 3/2022 | Agrawal | G06F 16/2246 |
| 2022/0164546 | A1* | 5/2022 | Jiang | G06F 16/35 |
| 2022/0222436 | A1* | 7/2022 | Perez | G06F 16/93 |
| 2022/0383159 | A1* | 12/2022 | Yavuz | G06F 16/3329 |

OTHER PUBLICATIONS

Bozzon, et al., "Liquid Query: Multi-Domain Exploratory Search on the Web", International World Wide Web Conference Committee, Apr. 26-30, 2010, pp. 161-170. https://dl.acm.org/doi/abs/10.1145/1772690.1772708.

Bozzon, et al., "Query splitting techniques and search service recommendation for multi-domain natural language queries", Mashups, Sep. 2011, 8 Pages. https://www.researchgate.net/publication/254002852_Query_splitting_techniques_and_search_service_recommendation_for_multi-domain_natural_language_queries.

Deng, et al., "Knowledge as a Bridge: Improving Cross-domain Answer Selection with External Knowledge", Proceedings of the 27th International Conference on Computational Linguistics, Aug. 20-26, 2018, pp. 3295-3305. https://www.researchgate.net/publication/329413247_Knowledge_as_A_Bridge_Improving_Cross-domain_Answer_Selection_with_External_Knowledge.

Mell et al., "The NIST Definition of Cloud Computing", Recommendations of the National Institute of Standards and Technology, NIST Special Publication 800-145, Sep. 2011, 7 pages.

Sen, et al., "ATHENA++: natural language querying for complex nested SQL queries", Proceedings of the VLDB Endowment, vol. 13, No. 11, Sep. 14, 2020, pp. 2747-2759. https://dl.acm.org/doi/10.14778/3407790.3407858.

* cited by examiner

IDENTIFYING AND PROCESSING POLY-PROCESS NATURAL LANGUAGE QUERIES

BACKGROUND

The present application relates generally to the field of computing, and more particularly to a natural language processing system for identifying and processing poly-process natural language queries.

Generally, question answering systems may include systems that automatically answer questions that are posed to the question answering system through information retrieval and natural language processing techniques. Typically, the question answering system may output answers by querying a structured database of knowledge or information using a standard query language known as Structured Query Language (SQL) to retrieve information stored in relational databases. Natural Language Processing (NLP) is a field of computer science, artificial intelligence, and linguistics concerned with the interactions between computers and human (natural) languages. A user having no technical background benefits greatly from having the ability to query a database using natural language queries.

SUMMARY

According to one embodiment, a method, computer system, and computer program product for identifying and processing poly-process natural language queries is provided. The embodiment may include receiving a natural language query. The embodiment may also include automatically identifying a bridge entity in the received natural language query. The embodiment may also include in response to determining that the received natural language query is the poly-process query, automatically determining whether the received natural language query is a poly-process query. The embodiment may further include automatically generating sub-queries for each process in the poly-process query and generating results for each sub-query. The embodiment may also include automatically combining the results of each sub-query using the bridge entity to output a combined result. The embodiment may further include automatically generating a modified sub-query for post-processing of the combined result. The embodiment may also include processing the modified sub-query to automatically generate a final query result for the received natural language query.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
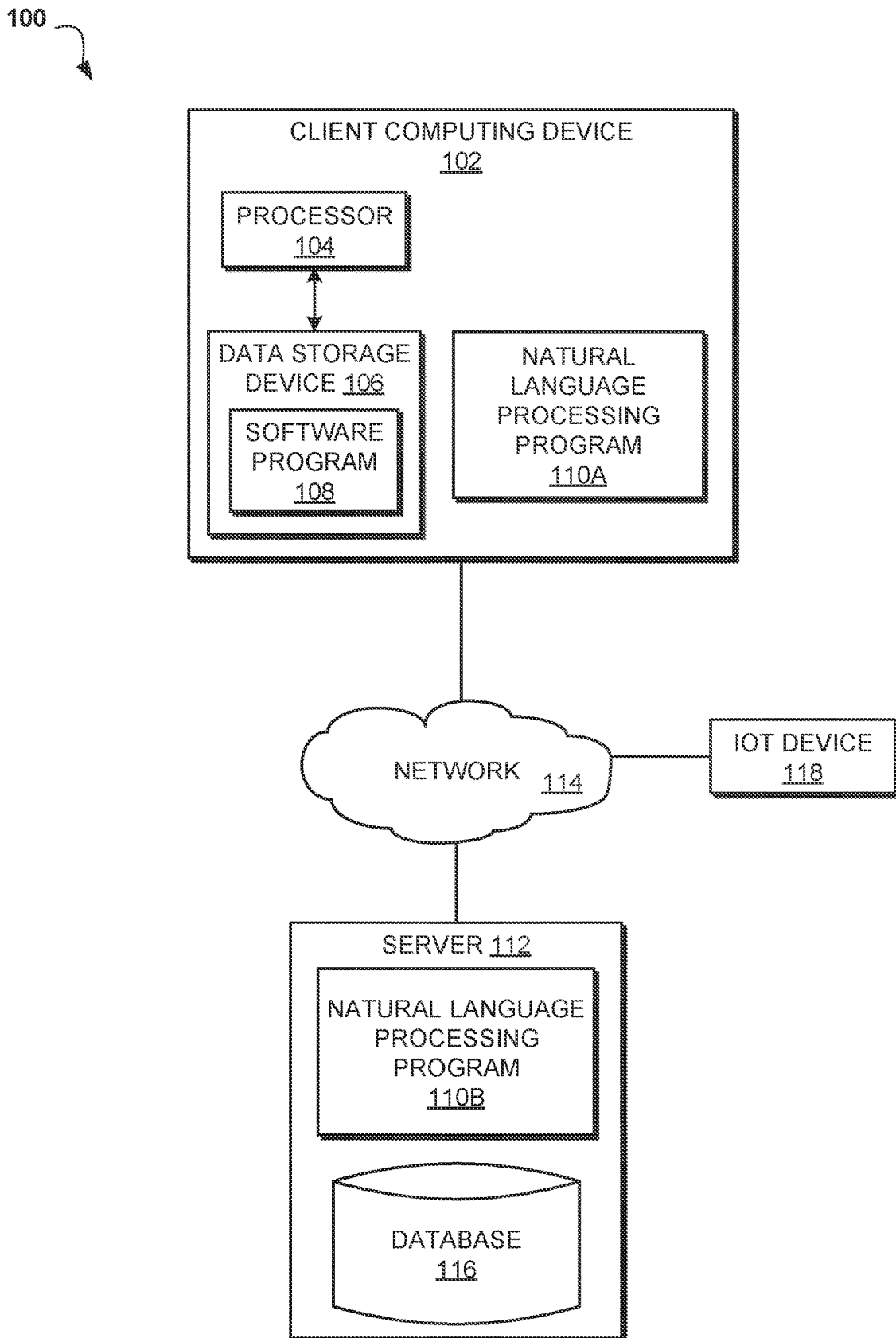
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate to the field of natural language processing, and more particularly to a system for identifying and processing poly-process natural language queries. The following described exemplary embodiments provide a system, method, and program product to, among other things, receive a natural language query, automatically determine whether the received natural language query is a poly-process query, and then automatically generate sub-queries that may be individually processed and combined to ultimately output an accurate result to the originally received natural language query. This improves processability of natural language queries that are poly-process queries requiring information from more than one database to be considered in order to obtain an accurate result. Therefore, the present embodiment has the capacity to improve natural language processing technology by automatically determining if the received natural language query is a poly-process query, and then automatically generate sub-queries that may be processed and combined to ultimately output an accurate result.

As previously described, Structured Query Language is a standard query language to retrieve information stored in relational databases. Common Relational Database Management Systems use SQL and have their own proprietary extensions. Hence, users need to learn the query language and be familiar with the database management system and database schema to formulate the query to produce the desired output query results. It is often challenging for non-technical end users to query relational databases without being trained technically. Therefore, many systems aim to convert Natural Language Queries (NLQ) into SQL queries to provide a more user-friendly experience.

Generally, people use natural language to communicate and ask questions in the real world. Natural Language Processing (NLP) is a field of computer science, artificial intelligence, and linguistics concerned with the interactions between computers and human (natural) languages. As such, NLP is often involved with natural language understanding, i.e., enabling computers to derive meaning from human or natural language input, and natural language generation.

When a user sends a natural language query, retrieving an accurate answer to the query may involve information contained within multiple databases. Typically, this is because a natural language query may span over multiple business processes and involves obtaining information from two different databases. For example, one portion of a given natural language query may involve information related to Business Practice Management (BPM) while another portion of a given natural language query may involve information related to Operation Decision Management (ODM). Existing systems often provide inaccurate results to poly-process queries as the existing systems are designed to process queries related to a single business process with the assumption that the query attributes such as entities, concepts, and filters are all present in the process schema and corresponding dataset accessible from the underlying databases associated with that single process. However, systems that only consider a singular business process when processing a poly-process natural language query can provide inaccurate query outputs, can generate unprocessable queries, and can result in a significant amount of wasted time on the part of the user providing the natural language query. Illustrative embodiments described herein utilize an analytical approach rooted in semantic and logical analysis to modify and process a received poly-process natural language query by determining a bridge entity contained therein and splitting the poly-process query into sub-queries that are individually processed and ultimately rejoined to obtain accurate results to a given poly-process natural language query that spans multiple business processes.

According to at least one embodiment, when a user inputs a natural language query into a computer system capable of employing methods in accordance with the present disclosure, the method, system, computer program product may automatically identify a bridge entity in the received natural language query. The method, system, computer program product may then automatically determine whether the received natural language query is a poly-process query. Next, the method, system, computer program product may, in response to determining that the received natural language query is the poly-process query, automatically generate sub-queries for each process in the poly-process query and generate results for each sub-query. According to one embodiment, the method, system, computer program product may then automatically combine the results of each sub-query using the bridge entity to output a combined result. Next, the method, system, computer program product may automatically generate a modified sub-query for post-processing of the combined result. Lastly, the method, system, computer program product may automatically generate a final query result for the received natural language query. The method, system, computer program product described herein therefore provides final query results for a received natural language query that were obtained by considering multiple databases across multiple business processes to ensure that accurate query results were obtained.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product system for identifying and processing poly-process natural language queries to improve the processability and accuracy of poly-process queries that involve information spanning across multiple business processes and multiple databases.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a natural language processing program 110A and communicate with the server 112 and IoT Device 118 via the communication network 114, in accordance with one embodiment of the present disclosure. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a natural language processing program 110B and a database 116 and communicating with the client computing device 102 and IoT Device 118 via the communication network 114, in accordance with embodiments of the present disclosure. As will be discussed with reference to FIG. 3, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a mobile device, a voice-controlled personal assistant, and/or any other IoT Device 118 known in the art for receiving queries that is capable of connecting to the communication network 114, and transmitting and receiving data with the client computing device 102 and the server 112.

According to the present embodiment, the natural language processing program 110A,110B may receive a natural language query. Natural language processing program 110A, 110B may then automatically determine whether the received natural language query is a poly-process query. Next, natural language processing program 110A,110B may in response to determining that the received natural language query is the poly-process query, automatically generate sub-queries for each process in the poly-process query and generate results for each sub-query. According to one embodiment, natural language processing program 110A, 110B may then automatically combine the results of each sub-query using the bridge entity to output a combined result. Next, natural language processing program 110A, 110B may automatically generate a modified sub-query for post-processing of the combined result. Lastly, natural language processing program 110A,110B may process the modified sub-query to automatically generate a final query result for the received natural language query. In turn, natural language processing program 110A,110B provides final query results for a received natural language query that were obtained by considering multiple databases across multiple business processes to ensure that accurate query results were obtained.

Figure 2:
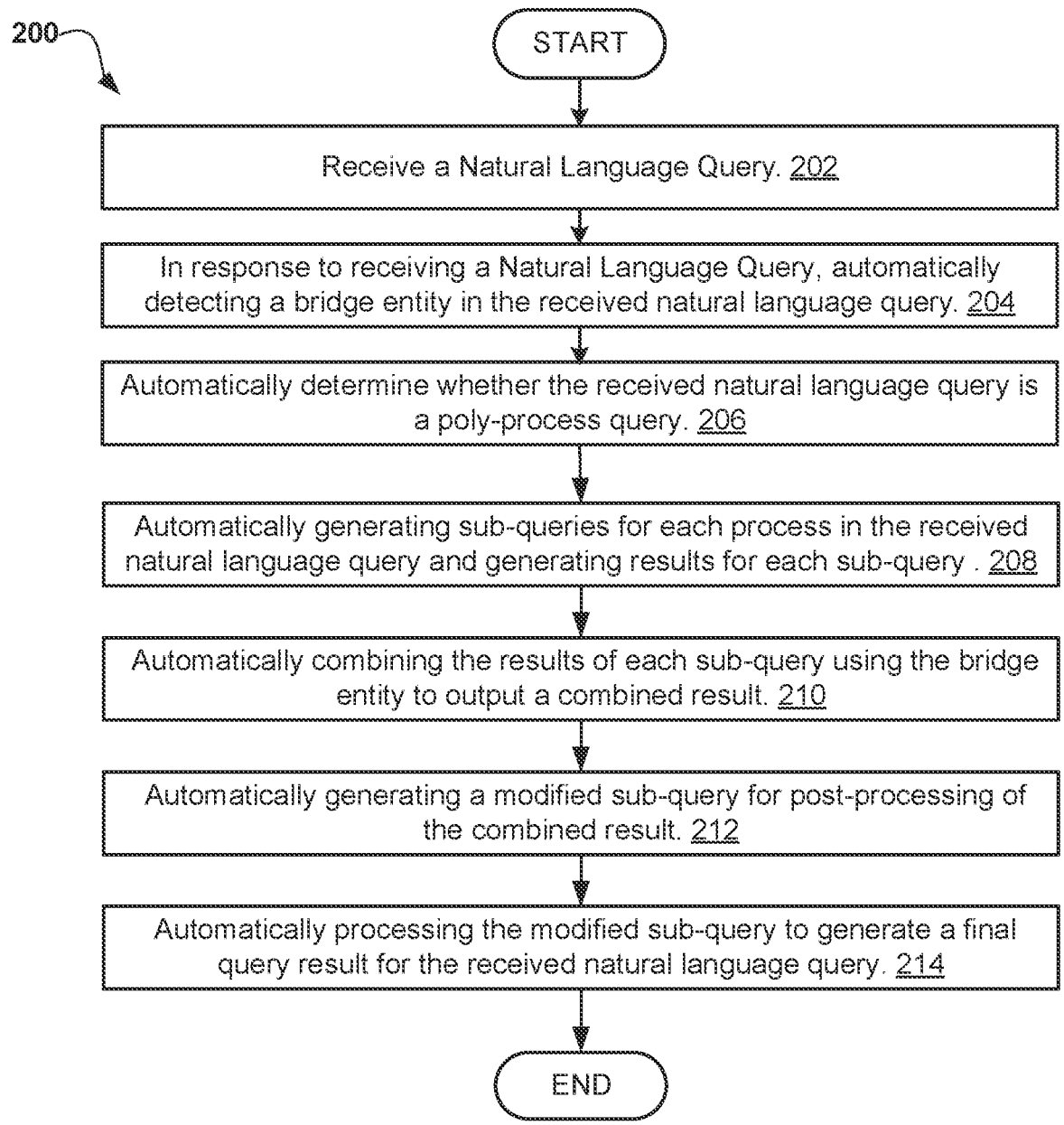
FIG. 2 illustrates an operational flowchart identifying and processing poly-process natural language queries according to at least one embodiment.

Referring now to FIG. 2, an operational flowchart system for identifying and processing poly-process natural language queries in a natural language query process 200 is depicted according to at least one embodiment. At 202, the natural language processing program 110A,110B receives a natural language query. The received natural language query may be input into the program via typing, spoken word, or any other suitable mechanism of inputting a natural language query into processing program 110A, 110B. The natural language query may be in the form of a statement or a question. For example, a given user may input 'I would like to know where Shop X is located" or "Could you please tell me the salary of Employee X?"

At 204, the natural language processing program 110A, 110B identifies a bridge entity in the received natural language query. In the context of this disclosure, a bridge entity is an entity in a received natural language query that is common between two or more sets of ontologies. The bridge entity may be explicitly present across different sets of ontologies, or may be constructively present across different sets of ontologies as a synonymous or closely-related entity. Natural language processing program 110A,110B may identify a bridge entity in a received natural language query by considering a pair of ontologies (i.e. O1,O2) and determining if there are common concepts between each of the sets of ontologies. In embodiments, natural language processing program 110A,110B may automatically, through intelligent matching, determine if there are common concepts between multiple sets of ontologies. For example, in embodiments, natural language processing program 110A, 110B may determine whether a concept C1 of an ontology O1 is related to a concept C2 of a second ontology O2 where C1 is an equivalent of C2 by considering if "C1.name==C2.name" or by alternatively considering if "C1.name" is a synonym of "C2.name" by using Wordnet, a thesaurus, or other suitable tools. In other examples, natural language processing program 110A,110B may consider, for example, if "C1.description~~C2.description" through sentence embedding similarity or the use of a natural language classifier (NLC).

In other embodiments, natural language processing program 110A,110B may receive user input that includes a human directly tagging concepts common between sets of ontologies, either at the time of creation or when asked to annotate, to easily allow natural language processing program 110A,110B to identify a bridge entity in a given natural language query. In yet another embodiment, a machine learning solution may be employed to facilitate discovery of bridge entities. For example, a machine learning layer L may be designed on top of an off-the-shelf ontology aligner. L would take an output O1,O2 of the off-the-shelf ontology aligner as a graph and generate a set of bridge entities "={(C1,C2)|C1\in O1 and C2 \in O2 and C1~C2}". Then a graph neural network (GNN) could be used to encode the graph input and train a sigmoid layer to output 0/1 for any pair of concepts (C1,C2). While each of the three described methods of identifying common concepts across ontologies have their own benefits and downsides, such as varying cost or levels of accuracy, any suitable method may be used to ultimately facilitate discovery of a bridge entity by natural language processing program 110A,110B.

In one example, natural language processing program 110A,110B may receive the query "Show me all zip codes with more than 3 loans getting approved in less than one month" In this example, the zip codes with more than 3 loans approved is information associated with operational decision management (ODM) business processes concerned with loan validation and may be found in a first database having a first set of ontologies. However, the "loans getting approved in less than 1 month" is information associated with business process management (BPM) business processes concerned with loan processing and may be found in a second database having a second set of ontologies. In this example, natural language processing program 110A,110B may check if any entities in the query are contained in multiple sets of ontologies (i.e. the first set of ontologies and the second set of ontologies). Natural language processing program 110A,110B then identifies "Loan" as being a potential bridge entity contained in multiple sets of ontologies, namely the first and second set of ontologies. Natural language processing program 110A,110B will then further consider the potential bridge entity by checking for similar properties across each ontology set. For example, natural language processing program 110A,110B may consider domain schemas and associated vocabulary indexes for each set of ontologies to check for commonalities. In embodiments, natural language processing program 110A,110B may also consider if there are similar descriptions in the documentation of each ontology. In this example, natural language processing program 110A,110B determines that the concept "Loan" is contained in both sets of ontologies and is related to similar properties and descriptions. Natural language processing program 110A,110B determines that "Loan" is present in both ontologies, and is associated with similar nouns and functional verbs across each set of ontologies, and is further associated with similar descriptions within the documentation of each ontology's vocabulary indexes. Accordingly, natural language processing program 110A,110B identifies "Loan" as the bridge entity in this received natural language query.

Next, at 206, the natural language processing program 110A,110B automatically determines if the received natural language query is a poly-process query that involves information spanning across multiple business processes and databases. In embodiments, natural language processing program 110A,110B automatically determines if the received natural language query is a poly-process query by identifying tokens which having meaningful matches in any of the process ontologies and by identifying tokens which have a meaningful match in any of the process data. In the context of this disclosure a token is any word contained in a received natural language query. Natural language processing program 110A,110B will determine that a received natural language query is a poly-process query if the tokens being considered have possible matches catering to different ontologies and if there is also no single ontology which contains possible meanings or matches for each query token. For example, in the exemplary natural language query "Show me all zip codes with more than 3 loans getting approved in less than one month", natural language processing program 110A,110B will automatically determine the tokens "zip code" and "month" are nouns that have matches catering to different ontologies and are not contained in any single ontology. Accordingly, natural language processing program 110A,110B determines that this natural language query is a poly-process query.

At 208, the natural language processing program 110A, 110B automatically generates sub-queries for each process in the poly-process query so that it may subsequently generate results for each sub-query. Natural language processing program 110A,110B may generate sub-queries including the language that matches each set of ontologies for each process contained in the received natural language query. For example, in the exemplary natural language query "Show me all zip codes with more than 3 loans getting approved in less than one month", natural language processing program 110A,110B may generate two individual sub-queries linked by the bridge entity "Loan". Natural language processing program 110A,110B may generate a first sub-query "Show me all zip codes with more than 3 loans approved" and a second sub-query "show me all loans getting approved in less than one month" linked by a bridge entity "Loan". Natural language processing program 110A, 110B may then process each of the sub-queries individually to obtain results.

In some exemplary queries, natural language processing program 110A,110B may use a combination of heuristics over the ontologies and query semantics within the received natural language query to determine if certain operations or functions should be executed later in time, rather than at the time of processing each individual sub-query. For example, in the exemplary received natural language query "What is the average duration for approving loan applications with borrowers having credits scores>500?" natural language processing program 110A,110B will generate two sub-queries. Natural language processing program 110A,110B generates a first sub-query stating "show me all loan applications with borrowers having credit scores>500" and a second sub-query "show me durations for all approved loan applications". Natural language processing program 110A, 110B determines that "loan application" is a bridge entity and generates the two sub-queries based on which tokens are associated with which processes. Natural language processing program 110A,110B also determines that the operation of calculating the "average" duration for approving loan applications is identified as modifying the joint results of the individual sub-queries. Natural language processing program 110A,110B may detect weak signals in the natural language query to determine that the operation of averaging should be performed upon the joint results at a later time. In this example, natural language processing program 110A, 110B may detect weak signals such as the word "with" following the bridge entity associated with the operation of averaging. Thus, natural language processing program 110A,110B may identify the calculation of the "average" as being an explicit joint operation involving both the sub-queries and will wait until post-processing to calculate the average. Post-processing will be discussed below in connection with 212.

At 210, natural language processing program 110A,110B automatically combines the results of each sub-query using the bridge entity to output a combined result. As stated above, in the exemplary natural language query "Show me all zip codes with more than 3 loans getting approved in less than one month", natural language processing program 110A,110B may generate two individual sub-queries linked by the bridge entity "Loan". Natural language processing program 110A,110B may generate a first sub-query "Show me all zip codes with more than 3 loans approved" and a second sub-query "show me all loans getting approved in less than one month" linked by a bridge entity "Loan".

Natural language processing program 110A,110B may then process each sub-query and obtain results. Natural language processing program will then automatically combine the results of each sub-query using the bridge entity. In this case, the joint results will include A) All zip codes which have more than 3 loans approved, and B) all loans approved in less than one month. In embodiments, natural language processing program 110A,110B may utilize a machine learning model to facilitate generating sub-queries for a received natural language query and ultimately rejoin the results. A machine learning model may include one or more algorithms, mathematical models, statistical models, and/or neural network models to perform a specific task without explicit instructions. In illustrative embodiments, a machine learning model may be pre-trained based on a corpus of data that includes examples of poly-process queries and generated sub-queries. Embodiments which utilize machine learning would be most suitable for environments in which millions of training examples are made available to learn to process poly-process queries.

At 212, natural language processing programs 110A, 110B generates a modified sub-query for post-processing of the combined result generated at 210. In the exemplary natural language query "Show me all zip codes with more than 3 loans getting approved in less than one month", natural language processing program 110A,110B generates combined results including A) All zip codes which have more than 3 loans approved, and B) all loans approved in less than one month. The combined result in this instance includes many more loans than what the user is attempting to gather. As discussed above, natural language processing program 110A,110B may use a combination of heuristics over the ontologies and query semantics in the context of the received natural language query to determine if certain operations or functions should be executed later in time during a post-processing step. In this instance, natural language processing program 110A,110B will generate a modified sub-query to filter the results to include loans that are common in each of the individual sub-query results. In other words, natural language processing program 110A,110B will generate a sub-query that will consider all of the loans approved in less than one month and will then filter out all loans that were not from a zip code having 3 or more loans approved in less than a month contained therein, as these limitations are explicit joint operations connecting the individual sub-queries.

Finally, at 214, natural language processing program 110A,110B automatically generates a final query result for the received natural language query by processing the modified sub-query generated for post-processing of the combined result.

It may be appreciated that FIG. 2 provides only an illustration of an exemplary implementation and does not imply any limitations with regard to how different embodiments may be implemented. Many modifications to the depicted environments may be made based on design and implementation requirements.

Figure 3:
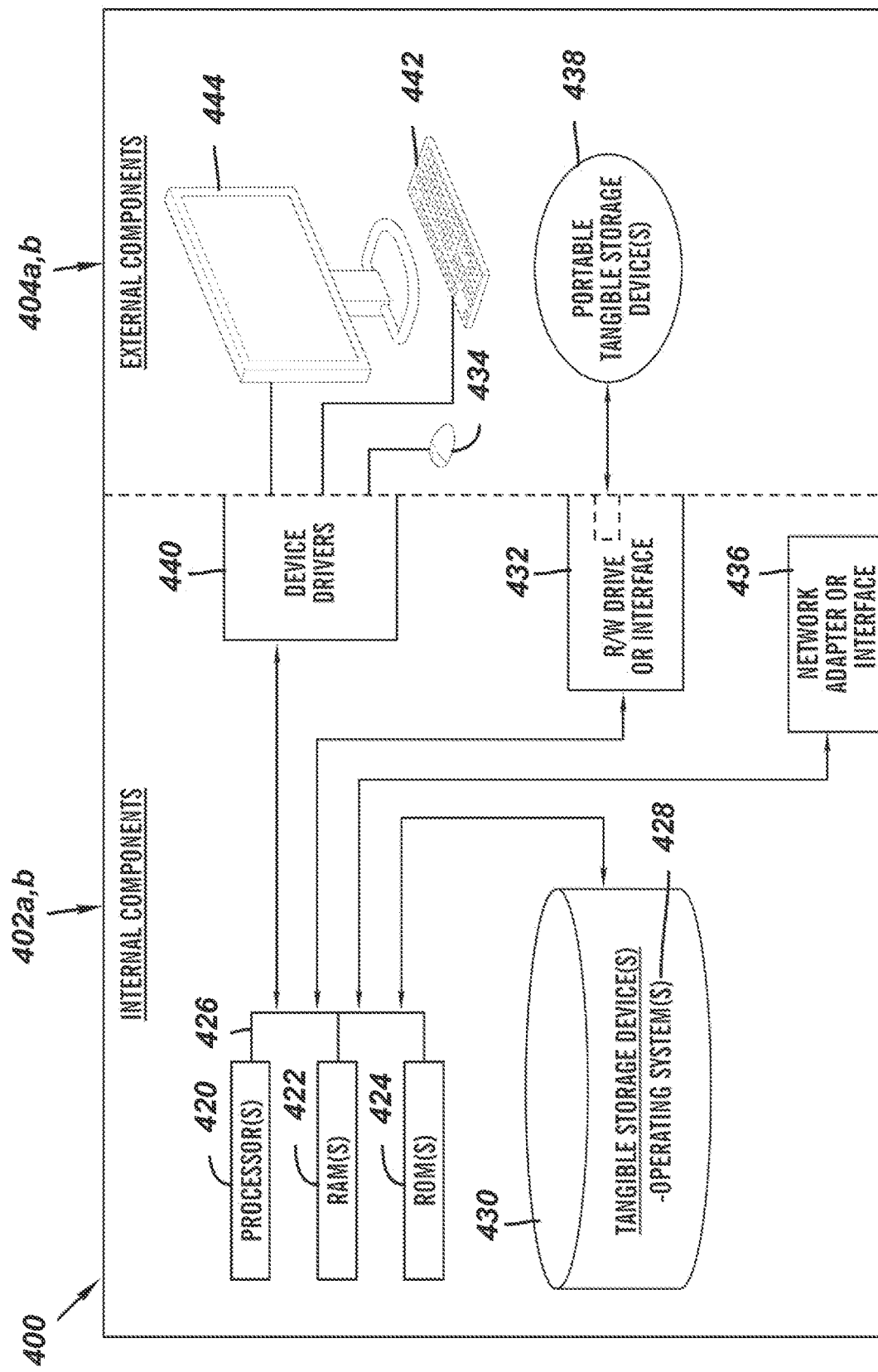
FIG. 3 is a functional block diagram of internal and external components of computers and servers depicted in FIG. 1 according to at least one embodiment.

FIG. 3 is a block diagram 400 of internal and external components of the client computing device 102 and the server 112 depicted in FIG. 1 in accordance with an embodiment of the present disclosure. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the natural language processing program 110A in the client computing device 102 and the natural language processing program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the natural language processing program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the natural language processing program 110A in the client computing device 102 and the natural language processing program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the natural language processing program 110A in the client computing device 102 and the natural language processing program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 include hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
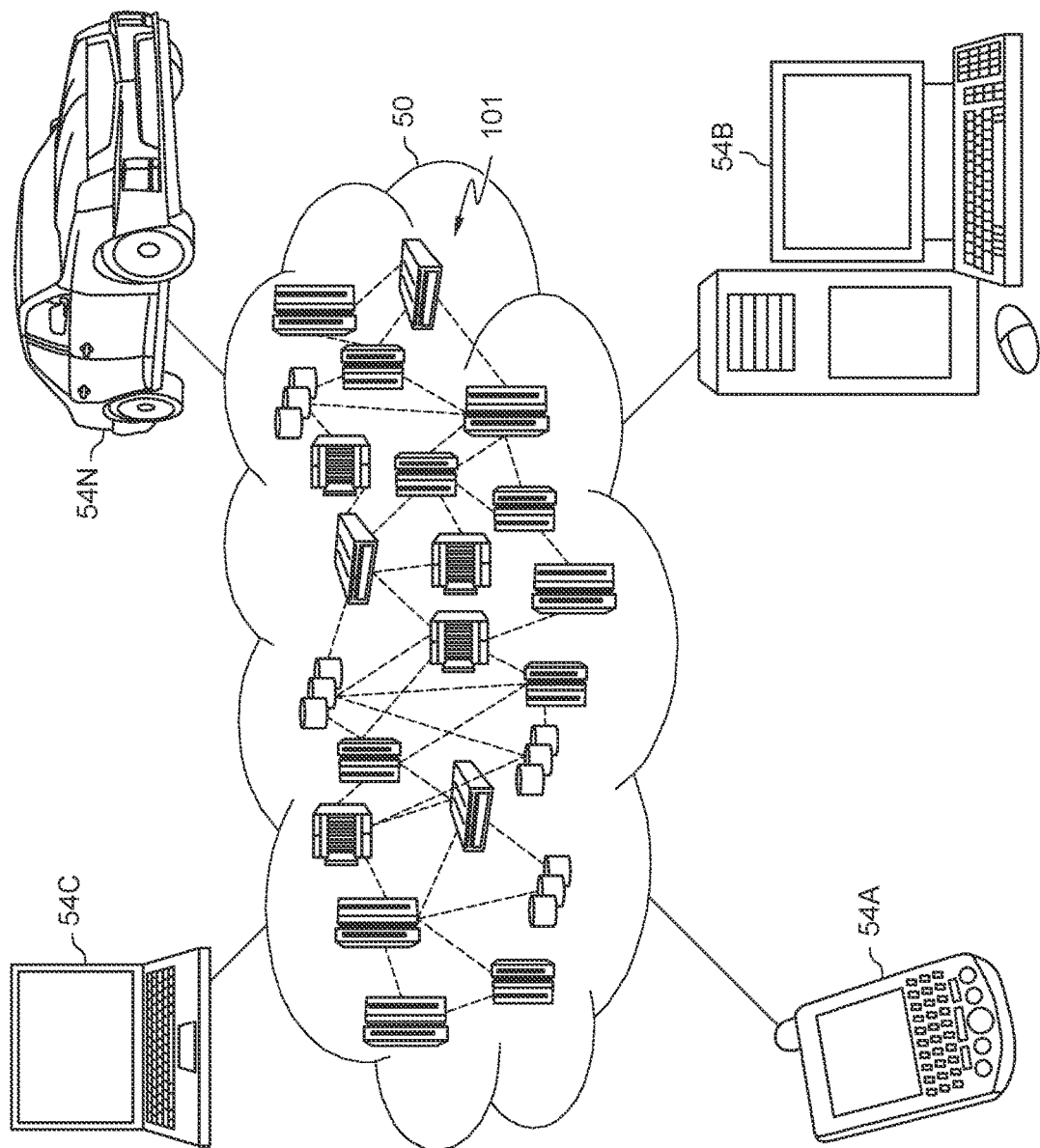
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 101 with which local computing devices used by cloud consumers, such as, for example, personal digital assistant (PDA) or cellular telephone 54A, desktop computer 54B, laptop computer 54C, and/or automobile computer system 54N may communicate. Nodes 101 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
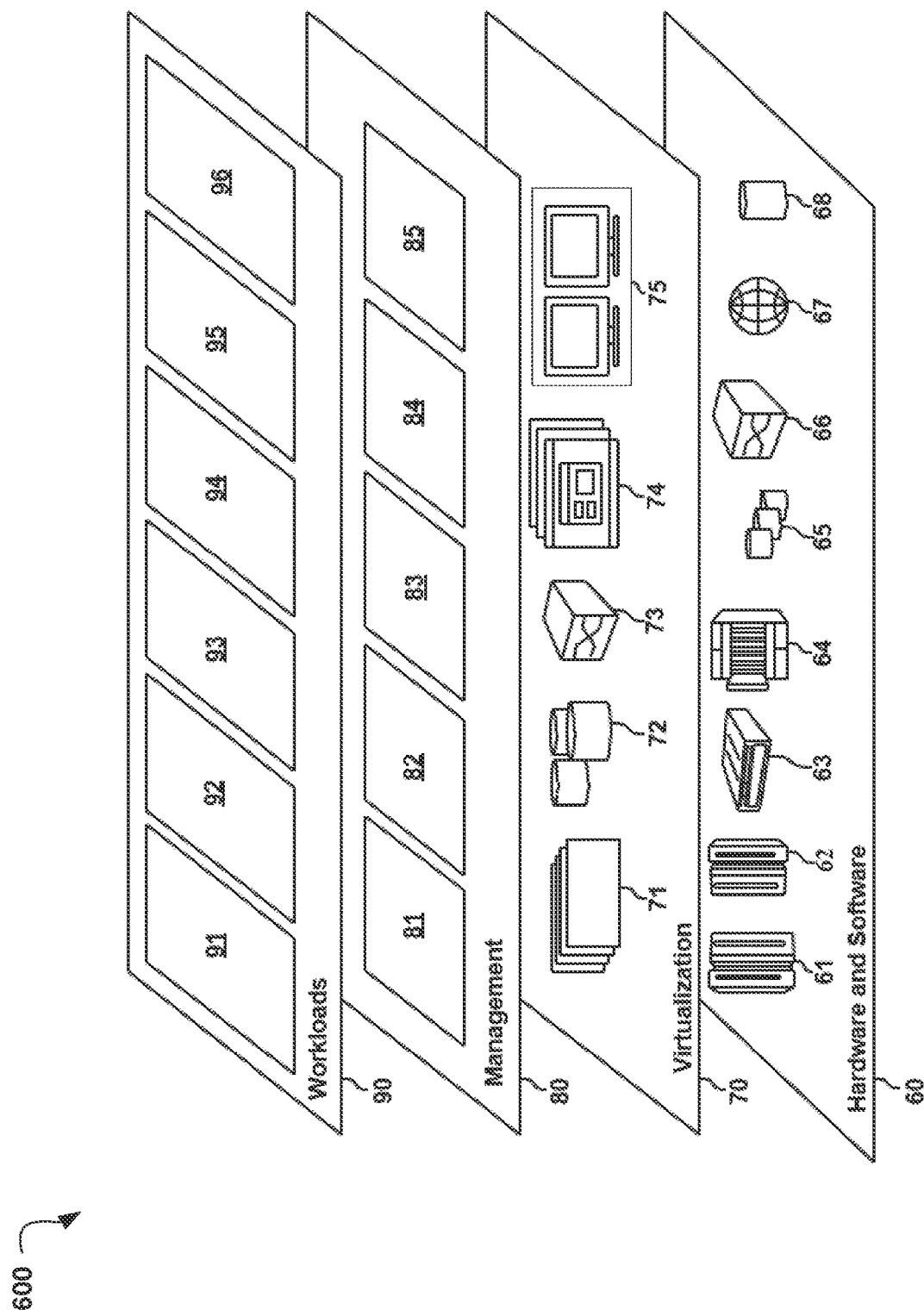
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying and processing poly-process natural language queries 96. Identifying and processing poly-process natural language queries 96 may relate to using semantic and logical relations to analyze a received natural language query to subsequently determine a bridge entity contained therein and split the poly-process query into sub-queries that are individually processed and ultimately rejoined to obtain accurate results to a given poly-process natural language query that spans multiple business processes.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of identifying and processing poly-process natural language queries, the method comprising:
receiving a natural language query;
automatically identifying a bridge entity in the received natural language query;
automatically determining whether the received natural language query is a poly-process query based on one or more query tokens in the received natural language query having matches in at least a first ontology, and at least one or more additional query tokens in the received natural language query having matches in at least a second ontology;
in response to determining that the received natural language query is the poly-process query, automatically generating sub-queries for each process in the poly-process query and generating results for each sub-query;
automatically combining the results of each sub-query using the bridge entity to output a combined result;
automatically generating a modified sub-query for post-processing of the combined result; and
automatically processing the modified sub-query to generate a final query result for the received natural language query.

2. The computer-based method of claim 1, wherein automatically identifying the bridge entity in the received natural language query further comprises:
comparing the first ontology to the second ontology to identify one or more common concepts in the received natural language query.

3. The computer-based method of claim 1, wherein automatically generating the sub-queries for each process in the poly-process query further comprises:
generating a first sub-query including language from the received natural language query based on the first ontology and a corresponding a first process; and
generating a second sub-query including language from the received natural language query based on the second ontology and a corresponding to a second process.

4. The computer-based method of claim 1, wherein automatically identifying the bridge entity in the received natural language query further comprises:
identifying the bridge entity in the received natural query based on a score-based probability extracted from machine learning.

5. The computer-based method of claim 1, wherein automatically generating the sub-queries for each process in the poly-process query further comprises:
identifying one or more joint operations that apply to each of the sub-queries and delaying the processing of the one or more joint operation until post-processing of the modified sub-query.

6. The computer-based method of claim 5, wherein automatically generating the modified sub-query for post-processing of the combined result further comprises:
processing the one or more joint operations in the modified sub-query.

7. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving a natural language query;
automatically identifying a bridge entity in the received natural language query;
automatically determining whether the received natural language query is a poly-process query based on one or more query tokens in the received natural language query having matches in at least a first ontology, and at least one or more additional query tokens in the received natural language query having matches in at least a second ontology;
in response to determining that the received natural language query is the poly-process query, automatically generating sub-queries for each process in the poly-process query and generating results for each sub-query;
automatically combining the results of each sub-query using the bridge entity to output a combined result;
automatically generating a modified sub-query for post-processing of the combined result; and
automatically processing the modified sub-query to generate a final query result for the received natural language query.

8. The computer system of claim 7, wherein automatically identifying the bridge entity in the received natural language query further comprises:
comparing the first ontology to the second ontology to identify one or more common concepts in the received natural language query.

9. The computer system of claim 7, wherein automatically generating the sub-queries for each process in the poly-process query further comprises:
generating a first sub-query including language from the received natural language query based on the first ontology and a corresponding first process; and
generating a second sub-query including language from the received natural language query based on the second ontology and corresponding second process.

10. The computer system of claim 7, wherein automatically identifying the bridge entity in the received natural language query further comprises:
identifying the bridge entity in the received natural query based on a score-based probability extracted from machine learning.

11. The computer system of claim 7, wherein automatically generating the sub-queries for each process in the poly-process query further comprises:
identifying one or more joint operations that apply to each of the sub-queries and delaying the processing of the one or more joint operations until post-processing of the modified sub-query.

12. The computer system of claim 11, wherein automatically generating the modified sub-query for post-processing of the combined result further comprises:
processing the one or more joint operations in the modified sub-query.

13. A computer program product, the computer program product comprising:
one or more computer-readable tangible storage medium and program instructions stored on at least one of the one or more computer-readable tangible storage medium, the program instructions executable by a processor capable of performing a method, the method comprising:

receiving a natural language query;

automatically identifying a bridge entity in the received natural language query;

automatically determining whether the received natural language query is a poly-process query based on one or more query tokens in the received natural language query having matches in at least a first ontology, and at least one or more additional query tokens in the received natural language query having matches in at least a second ontology;

in response to determining that the received natural language query is the poly-process query, automatically generating sub-queries for each process in the poly-process query and generating results for each sub-query;

automatically combining the results of each sub-query using the bridge entity to output a combined result;

automatically generating a modified sub-query for post-processing of the combined result; and automatically processing the modified sub-query to generate a final query result for the received natural language query.

14. The computer program product of claim 13, wherein automatically identifying the bridge entity in the received natural language query further comprises:

comparing the first ontology to the second ontology to identify one or more common concepts in the received natural language query.

15. The computer program product of claim 14, wherein automatically generating the sub-queries for each process in the poly-process query further comprises:

generating a first sub-query including language from the received natural language query based on the first ontology and a corresponding to a first process; and generating a second sub-query including language from the received natural language query based on the second ontology and a corresponding second process.

16. The computer program product of claim 13, wherein automatically identifying the bridge entity in the received natural language query further comprises:

identifying the bridge entity in the received natural query based on a score-based probability extracted from machine learning.

17. The computer program product of claim 13, wherein automatically generating the sub-queries for each process in the poly-process query further comprises:

identifying one or more joint operations that apply to each of the sub-queries and delaying the processing of the one or more joint operations until post-processing of the modified sub-query.

* * * * *